United States Patent
Ramachandran

(10) Patent No.: US 6,845,194 B2
(45) Date of Patent: Jan. 18, 2005

(54) OPTICAL BANDPASS FILTER USING LONG PERIOD GRATINGS

(75) Inventor: Siddharth Ramachandran, Hoboken, NJ (US)

(73) Assignee: Furukawa Electric North America Inc., Norcross, GA (US)

(*) Notice: Subject to any disclaimer, the term of this patent is extended or adjusted under 35 U.S.C. 154(b) by 141 days.

(21) Appl. No.: 10/167,684

(22) Filed: Jun. 11, 2002

(65) Prior Publication Data

US 2003/0002794 A1 Jan. 2, 2003

Related U.S. Application Data

(60) Provisional application No. 60/301,164, filed on Jun. 27, 2001.

(51) Int. Cl.[7] .............................. G02B 6/34; H01S 3/08; H04J 14/02
(52) U.S. Cl. ........................... 385/37; 385/27; 372/102; 398/87
(58) Field of Search ..................... 385/27, 37; 372/102; 398/87

(56) References Cited

U.S. PATENT DOCUMENTS

| | | | | |
|---|---|---|---|---|
| 6,021,240 A | * | 2/2000 | Murphy et al. | 385/37 |
| 6,058,226 A | * | 5/2000 | Starodubov | 385/12 |
| 6,084,996 A | * | 7/2000 | Judkins et al. | 385/37 |
| 6,317,538 B1 | * | 11/2001 | Shigehara et al. | 385/37 |
| 6,337,937 B1 | * | 1/2002 | Takushima et al. | 385/28 |
| 6,434,301 B2 | * | 8/2002 | Shin et al. | 385/37 |
| 6,522,810 B2 | * | 2/2003 | Takushima et al. | 385/37 |
| 6,542,666 B2 | * | 4/2003 | Tsuda et al. | 385/37 |
| 6,665,472 B2 | * | 12/2003 | Takushima et al. | 385/37 |
| 6,711,327 B2 | * | 3/2004 | Erdogan et al. | 385/28 |
| 2003/0215185 A1 | * | 11/2003 | Sirkis et al. | 385/37 |
| 2004/0071400 A1 | * | 4/2004 | Haroud et al. | 385/37 |

* cited by examiner

*Primary Examiner*—Brian Healy
*Assistant Examiner*—Daniel Petkovsek
(74) *Attorney, Agent, or Firm*—Peter V. D. Wilde

(57) ABSTRACT

The specification describes an optical filter wherein long period gratings (LPGs) are used in a new configuration to provide in-line bandpass filtering of optical signals. In the basic embodiment, two dissimilar LPGs are installed in the optical fiber transmission line. The first LPG converts light, over a broad wavelength range, being transmitted in the fundamental, or $LP_{01}$, mode of the optical fiber transmission line into light in a higher order mode (HOM) of the optical fiber. The mode-converted signal, with mode $LP_{m,n}$, is then coupled to a second waveguide, the second waveguide having transmission characteristics different from those of the first. The second waveguide supports propagation of light in a $LP_{m,n}$ mode. The mode-converted signal is then transmitted through a second LPG where the signal over a selected narrow band of wavelengths that is accepted by the second LPG is converted back to a $LP_{01}$ mode. The selected narrow band in the $LP_{01}$ mode propagates efficiently over the remainder of the optical fiber transmission path.

7 Claims, 4 Drawing Sheets

OPTICAL BANDPASS FILTER USING LONG PERIOD GRATINGS

RELATED APPLICATIONS

This application claims the benefit of provisional application 60/301,164 filed Jun. 27, 2001, which is incorporated herein by reference.

FIELD OF THE INVENTION

This invention relates to optical filters, and more particularly to optical bandpass filters with low loss.

BACKGROUND OF THE INVENTION

Optical bandpass filers transmit light over a predetermined band of wavelengths while rejecting, by absorption, radiation or scattering, all other wavelengths. Such filters are useful in laser cavities or optical communications systems. For example, they may be used to constrain the wavelength of operation of a laser, when deployed inside or outside the laser cavity. In optical communications systems, they can be used at the input of an optical receiver to separate unwanted light such as spontaneous emission noise outside the wavelength band of the signal. See D. M. Shamoon, J. M. H. Elmirghani, R. A. Cryan, "Characterisation of optically preamplified receivers with fibre Bragg grating optical fibers", *IEEE Colloquium on Optical Fiber Gratings*, March 1996. Optical regenerators based on self-phase modulation require extracting a predetermined wavelength band from a broad spectrum of light.

Several devices have been proposed and demonstrated to offer the functionality of bandpass filtering. Fiber Bragg gratings may be used in the reflection mode with a circulator, or in the transmission mode, to select a narrow wavelength band. See Xu, M. G.; Alavie, A. T. ; Maaskant, R.; Ohn, M. M.; "Tunable fiber bandpass filter based on a linearly chirped fiber Bragg grating for wavelength demultiplexing", *Electron Lett.*, 32, pp. 1918–1919 (1996). Operation in the reflection mode requires addition of a circulator in the transmission line—this increases cost, loss and complexity for the device. A further drawback with Bragg gratings, used either in transmission or reflection, is that such filters can be highly dispersive, which gives rise to pulse shape distortions. See Lenz, G.; Eggleton, B. J.; Giles, C. R.; Madsen, C. K.; Slusher, R. E.; "Dispersive properties of optical filters for WDM systems", IEEE Journal of Quantum Electronics, 34, pp. 1390–1402, (1998). Alternatively, thin film dielectric filters may also be used as bandpass filters (see: U.S. Pat. No. 5,615,289), but in addition to their dispersive nature (similar to Bragg gratings) they suffer from the additional drawbacks of being free-space devices. Thus, light needs to be coupled into fiber pigtails for use in such fiber-optic systems. This increases loss, cost and complexity.

An alternative technique for making bandpass filters uses two identical long-period fiber gratings (LPGs) that are spliced in series in the fiber-optic transmission line, with a core block between them. (See: U.S. Pat. No. 6,151,427.) The first long period grating converts a narrow wavelength-band of core-mode light into a cladding mode, and the second identical grating couples the cladding-mode light back into the core mode. The core block between the two LPGs attenuates or scatters any light that was not converted into the cladding mode. There are drawbacks associated with this device—(1) the core block simultaneously attenuates light in all the modes, thus the device is inherently lossy. Consequently only higher-order cladding modes may be utilized, as lower order cladding modes will exhibit even higher loss; (2) the core block forms a discrete discontinuity in the fiber, which leads to undesired mode-coupling and inter-modal interference; (3) tuning such a filter requires simultaneously tuning both LPGs by identical amounts, as the filter operates properly only when both LPGs have identical spectra. In bandpass filters using acousto-optically generated or microbend-induced LPGs, there is an additional drawback: the device is inherently polarization sensitive.

Thus, there exists a need for a bandpass filter that is an in-line fiber device, has low loss, is polarization insensitive, tunable, and simple to implement.

STATEMENT OF THE INVENTION

According to the invention, LPGs are used in a new configuration to provide in-line band pass filtering of optical signals in an optical system. In a preferred case the optical system is an optical fiber system. In the basic filter embodiment of the invention, two dissimilar LPGs are installed in serially cascaded optical waveguides of the transmission line. In the first waveguide of the filter, the signal light is initially transmitted in the fundamental, or $LP_{01}$ mode. The first LPG converts the signal light, over a broad wavelength range, into a higher order mode (HOM) of the first optical waveguide. The conversion is achieved using a broadband LPG that provide strong mode conversion over a broad spectrum. See. S. Ramachandran, M. F. Yan, L. C. Cowsar, A. C. Carra, P. Wisk, R. G. Huff and D. Peckham, "Large bandwidth, highly efficient mode coupling using long-period gratings in dispersion tailored fibers, " *Optics Letters*, vol. 27, pp. 698–700 (2002); U.S. Pat. No. 6,084,996, both incorporated by reference herein. In the following description the broadband LPG is designated BB-LPG. The BB-LPG operates by exciting either a core guided HOM or a cladding guided HOM of the first optical waveguide. The mode-converted signal, with mode $LP_{m,n}$, is then coupled to the second optical waveguide, the second waveguide having transmission characteristics different from those of the first optical waveguide. The second waveguide strongly couples to the $LP_{m,n}$ mode, because the second LPG, which may be a conventional LPG, provides a strong narrow band coupling between $LP_{m,n}$ and $LP_{01}$ modes of the second optical waveguide. The second LPG is referred to here as a narrow band LPG (NB-LPG).

Light entering the dual LPG filter first encounters the BB-LPG where more than 99% of the signal is converted to a $LP_{m,n}$ mode over a broad wavelength range. When the converted signal encounters the NB-LPG, the signal over a selected narrow band of wavelengths accepted by the NB-LPG is converted back to the $LP_{01}$ mode of the second waveguide. The selected narrow band in the $LP_{01}$ mode propagates efficiently over the remainder of the optical waveguide transmission path; i.e., the remainder of the second waveguide.

The mode distribution profiles of the $LP_{m,n}$ mode excited in the BB-LPG and the $LP_{m,n}$ converted in the NB-LPG do not have to match, as long as the order of the modes (m and n) are the same. The BB-LPG and the NB-LPG may comprise separate waveguide sections, or may be formed in same length of waveguide. The waveguides are preferably optical fibers. If the LPGs comprise separate optical fibers spliced together the signal adiabatically couples at the splice since the mode shapes are the same.

DETAILED DESCRIPTION

Figure 1:
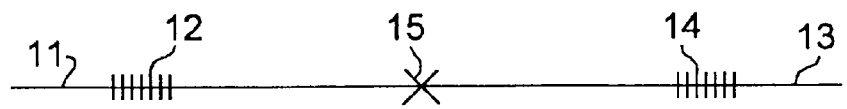
FIG. 1 is a schematic diagram of the bandpass filter of the invention.

Referring to FIG. 1, the arrangement shown represents the generic form of the bandpass filter of the invention. The filter comprises a first fiber section 11 with a BB-LPG 12, a second fiber section 13, with a NB-LPG 14, and a splice 15 connecting the two fiber sections together. The splice 15 adiabatically converts the HOM of fiber 11 to the HOM of fiber 13. The BB-LPG 12 has a grating period selected for broad-band mode conversion, and the NB-LPG 14 has a different grating period chosen for narrow band, i.e., bandpass, mode conversion. The choice of grating periods is illustrated in FIG. 2.

Figure 2:
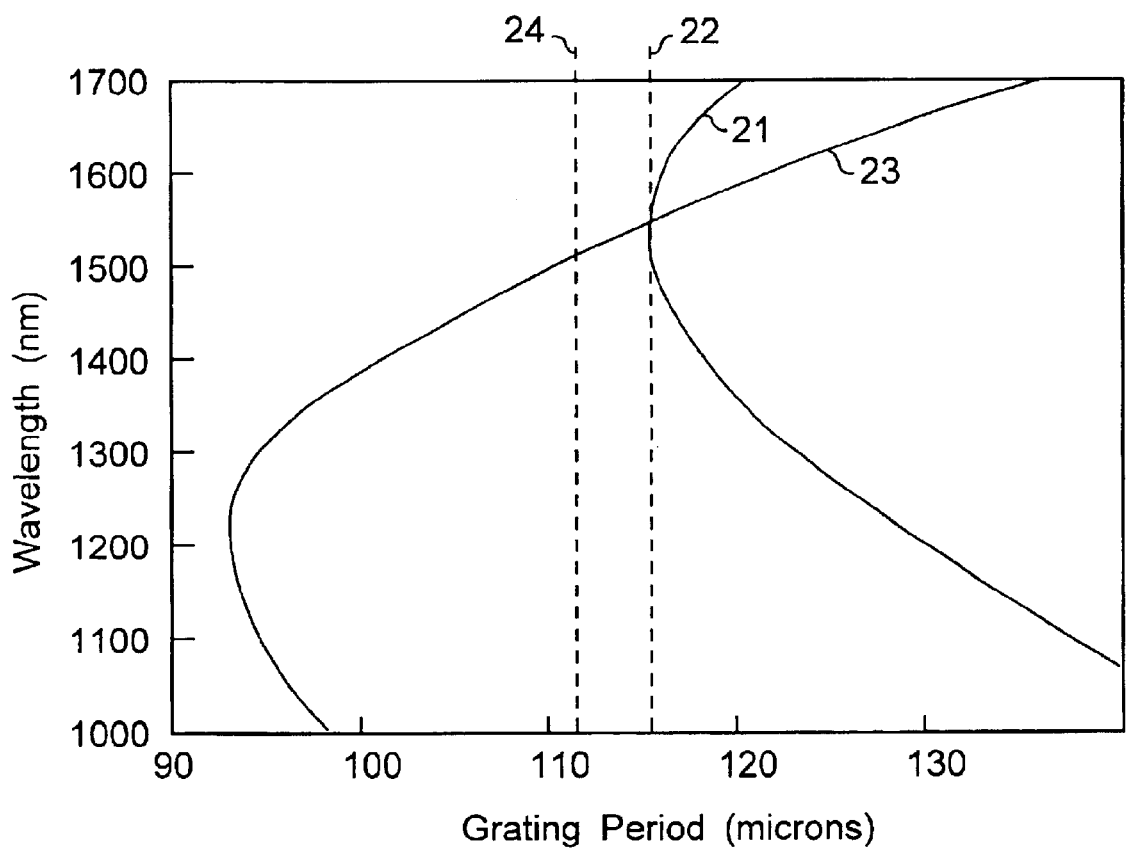
FIG. 2 is a plot of grating period vs. wavelength showing the relationship for two LPGs in different optical fibers.

With reference to FIG. 2, phase-matching relationships are shown for LPGs coupling the $LP_{01}$ mode to the $LP_{02}$ mode (for example). Curve 21 represents the phase-matching relationship of a fiber that yields a BB-LPG at about 1470 nm. A unique feature of the curve 21 is the turn-around point (TAP) in the phase matching relationship. At the TAP a vertical line 22 is tangent to the phase-matching curve 21. If a grating period has the value corresponding to the tangent line 22, a broad range of wavelengths approximately satisfy the phase-matching relationship. For wavelengths in this range, a BB-LPG results, because the wavelengths are at or close to resonance near the TAP. In this example, a BB-LPG with a period of 115 microns (line 22) yields a BB-LPG at about 1470 nm.

Curve 23 corresponds to the phase-matching relationship of a LPG in a second fiber. From curve 23, one sees that the LPG yields a NB-LPG for any wavelength greater than about 1300 nm. That is, for wavelengths greater than 1300 nm, a vertical line corresponding to a selected grating period is never tangent to the phase-matching curve 23. Thus, there is not a broad range of wavelengths that approximately satisfy the phase-matching relationship. For example, line 24, intersects the phase-matching relationship at only one wavelength.

In this illustration, curve 23 represents a fiber with the same index profile as that represented by curve 21, but the fiber associated with curve 23 is drawn to a diameter that is 80% of the original diameter of the fiber associated with curve 21. Dimensionally scaling a fiber in this manner shifts the TAP of the fiber. Thus, a fiber that yields a BB-LPG when drawn to one diameter, yields a NB-LPG when drawn to a different diameter. Dimensionally scaling is one of several ways to shift or adjust the TAP of the fiber. The same objective may be realized by inducing a constant index change in the fiber, or by etching the outer diameter of the cladding. While the former technique will result in shifting the TAP of both a cladding mode as well as a core-guided mode, the latter will be useful when the HOM employed for the bandpass filter is a cladding mode.

Figure 3:
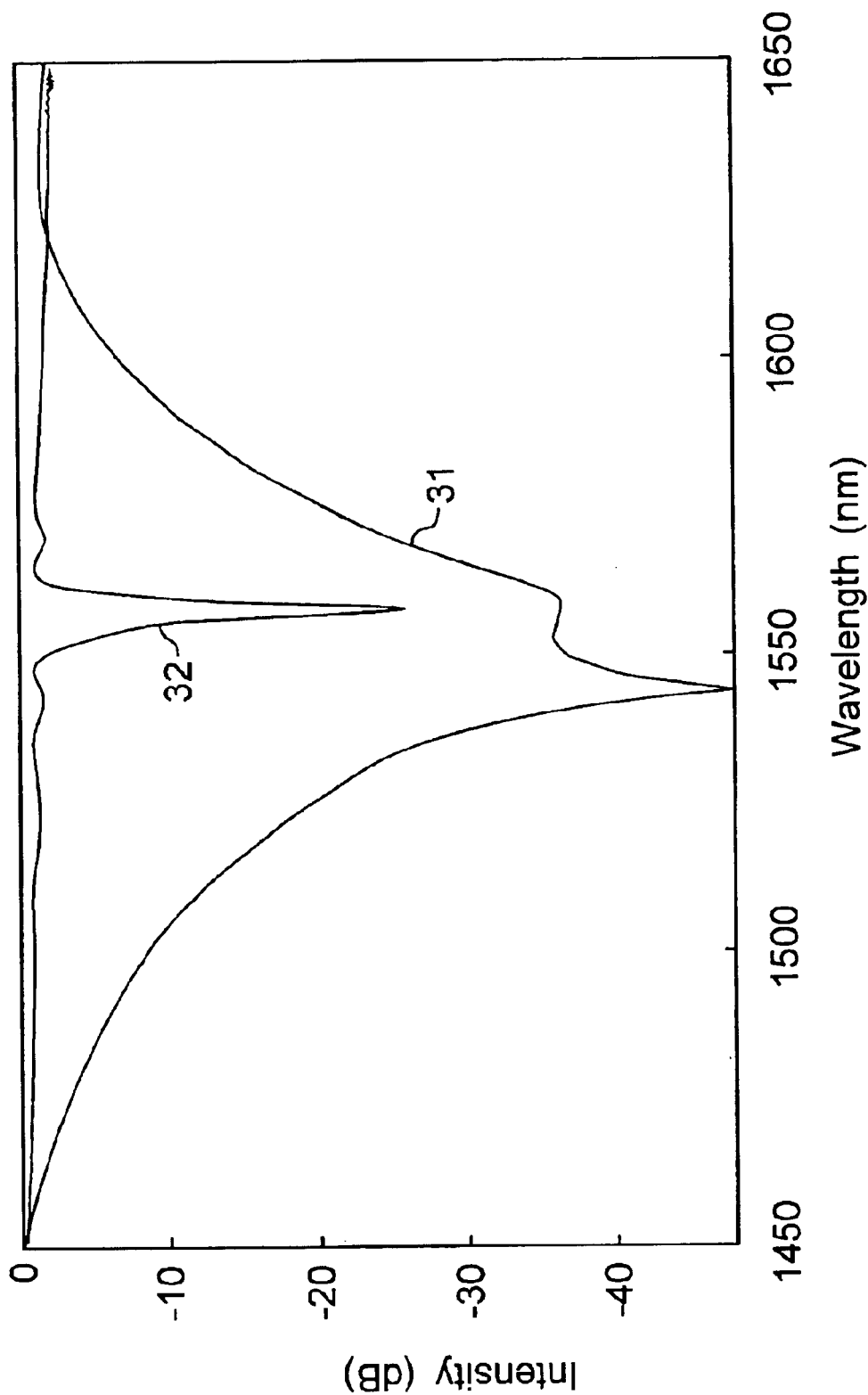
FIG. 3 is a plot of intensity vs. wavelength showing the effective mode conversion properties for the BB-LPG and the NG-LPG.

To illustrate the characteristics of the fiber sections 11 and 13 in the filter of FIG. 1, experimentally obtained spectra are shown in FIG. 3. The phase-matching curve 21 of FIG. 2 for fiber 11 (outer diameter, OD=121 μm) has a TAP at 1540 nm. An LPG written at the corresponding grating period (112.5 μm) converts the incoming $LP_{01}$ mode into the $LP_{02}$ mode over the entire C-band. The length of this grating is 1 cm, with an index perturbation of $5\times10^{-3}$. This illustrates that more than 99% (>20 dB) of light is converted over a spectral range between 1527 nm and 1571 nm.

More generally, the wavelength range of the BB-LPG may be controlled by suitably designing a fiber with different dispersion properties for the fundamental mode and the HOM.

The bandwidth, Δλ, of the BB-LPG is given by:

$$\Delta\lambda = A \times \lambda_{res}/\sqrt{L \times \Delta D \times c}$$

where ΔD is the difference in dispersion between the two modes that are being coupled by the BB-LPG, L is the length of the grating, $\lambda_{res}$ is the resonant wavelength (where maximum coupling occurs), c is the velocity of light in a vacuum, and A is a constant determined by the maximum coupling strength of the grating. Thus, a variety of broad-band spectra may be obtained utilizing this concept. The wavelength range in a typical BB-LPG may range from 40 to 100 nm.

Fiber section 13 is a few-mode fiber similar to fiber 11, but is drawn to an OD of 112 μm. The spectrum of an NB-LPG in this fiber is shown by curve 32 in FIG. 3. This spectrum is for a 5.7 cm long uniform LPG with a grating period of 120 μm, and an index perturbation of $1\times10^{-4}$. The 3 dB bandwidth is 7 nm and provides 99.6% (24 dB) mode-conversion at the resonant wavelength of 1555 nm. The LPG spectra may be tailored in bandwidth by modifying the dispersive properties of the fiber, or the physical parameters of the grating.

The bandwidth, Δλ, of the NB-LPG is given by:

$$\Delta\lambda = A \times \lambda_{res}^2 / L \times \Delta n_g$$

where $\Delta n_g$ is the difference in the group indices between the two modes that are being coupled by the NB-LPG, and the rest of the terms are as defined earlier. In addition to control over bandwidth, chirping the period of the grating, or apodizing the index perturbations of the gratings, can yield a multitude of spectral shapes (e.g. rectangular, Gaussian, etc.).

With reference to the elements of FIG. 1, the device functions as follows.

Figure 4:
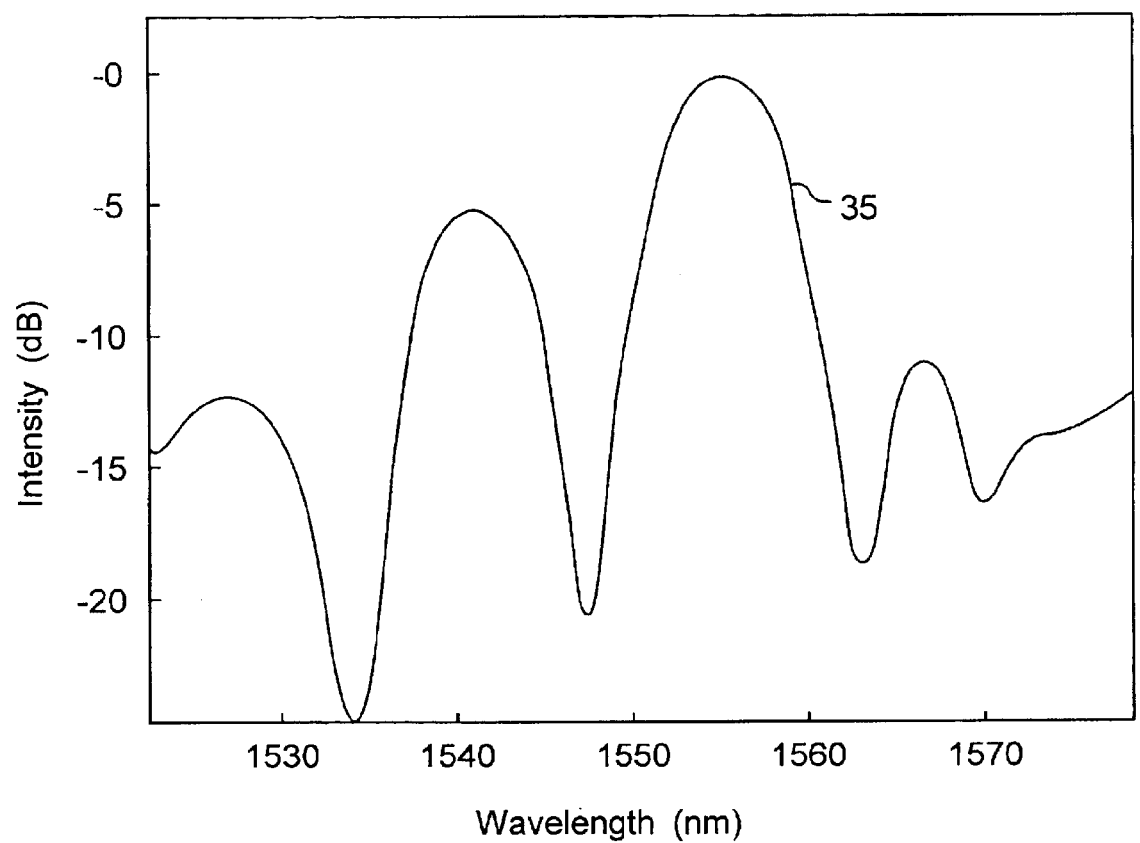
FIG. 4 is a plot similar to that of FIG. 3 for the filter of FIG. 1, i.e. with the combined LPGs.

Essentially all light in an entire communications band passing through BB-LPG 12 is converted to the $LP_{02}$ mode. As the $LP_{02}$ mode light traverses splice 15, that splices fiber section 11 to fiber section 13, the $LP_{02}$ mode light of fiber 11 is adiabatically converted into the $LP_{02}$ mode of fiber 13. Then, the NB-LPG 14 selects a desired narrow portion of the spectrum and converts that back into the $LP_{01}$ mode. This results in a bandpass filter, with properties shown by curve 35 in FIG. 4.

The device illustrated in FIG. 1 provides a general platform for building band-selection as opposed to band-rejection filters with LPGs. The first mode-converter, BB-LPG 12, only serves as a device that provides a spatially modified input for NB-LPG 14, and does not define the spectral characteristics of the bandpass filter. The spectrum of the filter is defined by the inverted spectrum of the NB-LPG 14. Further, instead of only one NB-LPG 14, several NB-LPG may be added in series. Alternatively, the NB-LPG may be designed to possess multiple narrowband resonances. This enables the prospect of spectral shaping in the band-pass configuration by varying the spectral properties of one or more NB-LPG 14.

The device just described has an advantage over conventional filters using LPGs in that no core-blocking element is used. This avoids the loss inherent in devices with that configuration. For the purpose of defining this distinction, the transmission path between the BB-LPG and the NB-LPG functions adiabatically. Furthermore, the transmission path coupling the LPGs does not include an active attenuation element, i.e. an element that has an intended and deliberate function of attenuating light. It is not intended that a conventional splice, which is designed for minimum light attenuation as is not, in this context, an active attenuation element.

The splice element 15 in FIG. 1 adiabatically transforms the HOM of fiber 11 (after traversing the NB-LPG) into a HOM of fiber 13. This may be achieved by inducing a heat profile along the splice and/or tapering one fiber with respect to the other to ensure that the two HOMs couple efficiently. In the embodiment shown in FIG. 1, the two fibers 11 and 13 are shown with a physical splice joining them, i.e. fibers 11 and 13 are separate fibers. The physical splice 15, and the attendant loss in that splice, may be avoided by making a single fiber with two distinct transmission characteristics. For example, the diameter of the fiber may be made to vary longitudinally along the fiber length, i.e. a first section with a first diameter, and a second section with a second diameter. Alternatively, the cladding may be selectively modified from one portion of a single fiber to another. Therefore, the functional operation of splice 15 is the important aspect, and may be defined as a means for effecting a change from a HOM with one characteristic to a corresponding HOM with a different characteristic.

Since uniform LPGs are not dispersive filters, the bandpass filters described here are not dispersive.

The filter of the invention may also be tuned by inducing a shift in the phase-matching curve for the NB-LPG (curve 23 of FIG. 2). Alternatively, doping the cladding of the fiber, or coating the outside cladding of the fiber with an electro-optic or non-linear optic material allows electrical or optical control of the resonant wavelength of the bandpass filter.

The bandpass filter of the invention may be used in a variety of systems. For example, a variety of laser devices can be tuned using the bandpass filter of the invention as an intracavity element. In a conventional laser cavity, defined by two narrowband reflectors, one high reflector and one weak reflector (output mirror), the two narrow band reflectors are replaced by two broadband reflectors (one high and one weak) with the bandpass filter of the invention in the cavity. The lasing wavelength may be adjusted by tuning the filter. Multiple lasing wavelengths can be produced by having one or more NB-LPGS in the bandpass filter that have multiple resonances.

Figure 5:
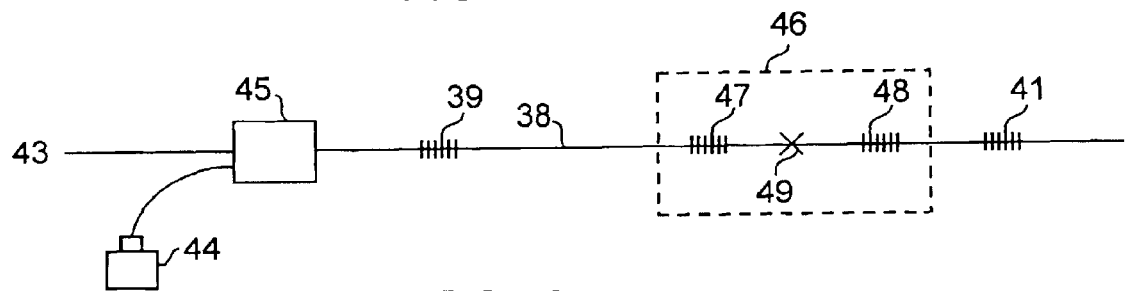
FIG. 5 is a schematic diagram illustrating the use of the optical filter of the invention in a laser.
Figure 6:
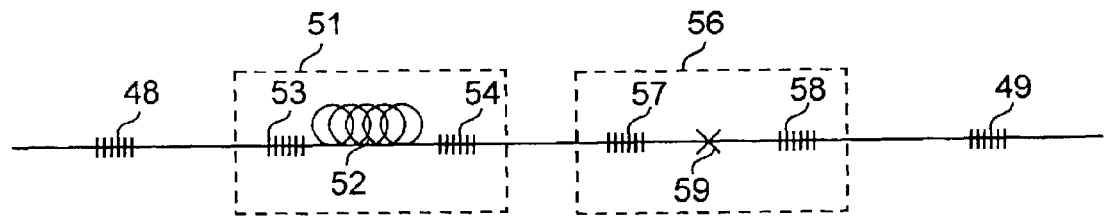
FIG. 6 is a schematic diagram illustrating the use of the optical filter of the invention in a Raman laser.
Figure 7:
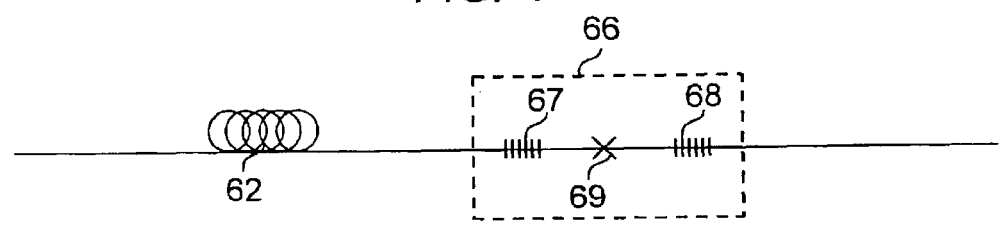
FIG. 7 is a schematic illustration of the use of the optical filter of the invention in an optical signal regenerator device.
Figure 8:
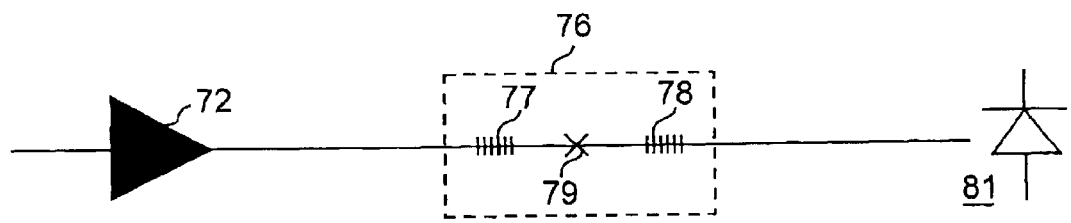
FIG. 8 is a schematic representation of a system using the optical filter of the invention in an optical preamplifier for an optical receiver.

An illustration of this generalized form of laser is shown in FIG. 5, where the gain fiber is shown at 38, high reflector at 39, weak reflector at 41, input signal at 43, laser pump at 44, and WDM for combining signal and pump at 45.

What is claimed is:

1. An optical filter comprising:
   a. an optical waveguide having a first portion and a second portion, the first and second portions being serially connected, the first portion having optical transmission characteristics that are different than those of the second portion;
   b. a first long period grating for converting signal light propagating in mode $LP_{01}$ into a signal propagating in mode $LP_{m,n}$,
   c. an optical coupler configured to transmit a signal light propagating in mode $LP_{m,n}$ in the first portion to $LP_{r,s}$ mode light in the second portion, wherein m=r and n=s,
   d. a second long period grating for converting a selected band $DI_2$ of the signal light propagating in mode $LP_{r,s}$ in the second portion to light propagating in mode $LP_{01}$.

2. The optical filter of claim 1, further comprising:
   a lightwave signaling means for introducing a lightwave signal into the first portion, the introduced lightwave signal having a bandwidth $DI_1$ and propagating as mode $LP_{01}$.

3. The optical filter of claim 2 wherein the optical coupler comprises a fiber splice.

4. The optical filter of claim 1 wherein the first portion of optical waveguide and the second portion of optical waveguide each comprise optical fiber.

5. The optical filter of claim 1 wherein the phase-matching relationship of a long period grating in the first optical waveguide is different from the phase matching relationship of a long period grating in the second optical waveguide.

6. Method for filtering an optical signal with band $\Delta\lambda_1$ comprising:
   a. transmitting the signal through a first waveguide, the signal comprising an $LP_{01}$ mode,
   b. transmitting the $LP_{01}$ signal mode through a long period grating in the first waveguide, the long period grating having a wide pass band, thereby converting the $LP_{01}$ signal mode to higher order signal mode $LP_{m,n}$,
   c. transmitting the higher order mode $LP_{m,n}$ through a second waveguide, the second waveguide having transmission properties different from those of the first waveguide, whereby the higher order signal mode $LP_{m,n}$ in the signal propagates as higher order signal mode $LP_{r,s}$ in the second waveguide, where m=r and n=s,
   d. transmitting the higher order signal mode $LP_{r,s}$ through a long period grating in the second waveguide and converting a selected portion $\Delta\lambda_2$ of the higher order signal mode $LP_{r,s}$ to signal mode $LP_{01}$, where $\Delta\lambda_1$ is substantially greater than $\Delta\lambda_2$.

7. An optical system comprising an optical filter serially connected to a cascaded Raman resonator, the Raman resonator having a Raman resonator cavity, the optical filter comprising:
   a. An optical filter having a first portion and a second portion,
   b. a broad band long period grating in the first portion of optical fiber,
   c. a narrow band long period grating in the second portion of optical fiber, and
   d. a coupler for serially coupling the first portion and the second portion.

* * * * *